(12) United States Patent
Wilson et al.

(10) Patent No.: US 10,469,473 B2
(45) Date of Patent: Nov. 5, 2019

(54) NETWORK AUTHENTICATION SYSTEM EXTENSIONS

(71) Applicant: Hewlett Packard Enterprise Development LP, Houston, TX (US)

(72) Inventors: David Wilson, Sunnyvale, CA (US); Cameron Esdaile, Sunnyvale, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 296 days.

(21) Appl. No.: 15/253,223

(22) Filed: Aug. 31, 2016

(65) Prior Publication Data

US 2018/0060060 A1  Mar. 1, 2018

(51) Int. Cl.
| | | |
|---|---|---|
| *H04L 29/06* | (2006.01) | |
| *G06F 21/45* | (2013.01) | |
| *G06F 21/62* | (2013.01) | |

(52) U.S. Cl.
CPC .............. *H04L 63/08* (2013.01); *G06F 21/45* (2013.01); *G06F 21/629* (2013.01)

(58) Field of Classification Search
CPC ..... G06F 8/60; G06F 8/61; G06F 8/65; G06F 8/70; G06F 8/71; G06F 8/76
USPC .................................................. 717/168–178
See application file for complete search history.

(56) References Cited

U.S. PATENT DOCUMENTS

| | | | | |
|---|---|---|---|---|
| 6,163,812 A * | 12/2000 | Gopal | ...................... | H04L 69/10 719/310 |
| 6,950,935 B1 * | 9/2005 | Allavarpu | ........... | H04L 63/0428 713/153 |
| 7,155,737 B1 * | 12/2006 | Lim | ......................... | G06F 21/33 726/2 |
| 7,392,522 B2 * | 6/2008 | Murray | ............... | G06F 9/44526 717/174 |
| 7,467,392 B1 * | 12/2008 | Ludwig | ................. | G06F 9/4411 710/19 |
| 7,908,602 B2 * | 3/2011 | Alcorn | ................... | G06Q 30/06 709/219 |

(Continued)

OTHER PUBLICATIONS

D. Decasper, Z. Dittia, G. Parulkar and B. Plattner, "Router plugins: a software architecture for next-generation routers," in IEEE/ACM Transactions on Networking, vol. 8, No. 1, pp. 2-15, Feb. 2000. (Year: 2000).*

(Continued)

*Primary Examiner* — Andrew M. Lyons
(74) *Attorney, Agent, or Firm* — Brooks, Cameron & Huebsch, PLLC

(57) ABSTRACT

Example implementations relate to network authentication system extensions. For example, network authentication system extensions may be installed and executed using a system. The system may comprise a processing resource and a memory resource storing readable instructions. The instructions may cause the processing resource to initiate an extension system and initiate an application programming interface (API) to manage a plurality of installed extensions in the extension system, where the installed extensions operate on a network authentication system. The instructions may also cause the processing resource to define a particular instance of an installed extension among the plurality of installed extensions and execute installed extensions on the network authentication system.

20 Claims, 5 Drawing Sheets

(56) References Cited

U.S. PATENT DOCUMENTS

| | | | | |
|---|---|---|---|---|
| 8,074,231 B2* | 12/2011 | Hunt | G06F 9/4411 | 719/321 |
| 8,356,294 B2* | 1/2013 | Raghavan | H04L 67/34 | 717/117 |
| 9,294,482 B2* | 3/2016 | Mellor | H04L 63/102 | |
| 2005/0289535 A1* | 12/2005 | Murray | G06F 8/61 | 717/172 |
| 2006/0235985 A1* | 10/2006 | Ramkumar | H04L 63/102 | 709/229 |
| 2006/0288404 A1* | 12/2006 | Kirshnan | G06F 8/656 | 726/5 |
| 2007/0088741 A1* | 4/2007 | Brooks | G06F 17/30575 | |
| 2008/0196010 A1* | 8/2008 | Raghavan | H04L 67/34 | 717/121 |
| 2009/0119662 A1* | 5/2009 | Fangmeier | G06F 8/60 | 717/176 |
| 2010/0058328 A1* | 3/2010 | DeHaan | G06F 8/61 | 717/176 |
| 2010/0131922 A1* | 5/2010 | Shenfield | G06F 8/20 | 717/107 |
| 2011/0173251 A1* | 7/2011 | Sandhu | G06F 8/61 | 709/203 |
| 2011/0258333 A1* | 10/2011 | Pomerantz | H04L 63/0428 | 709/229 |
| 2011/0277028 A1* | 11/2011 | Piazza | H04L 63/0209 | 726/11 |
| 2012/0143791 A1* | 6/2012 | Sathish | H04L 67/30 | 706/12 |
| 2013/0024910 A1* | 1/2013 | Verma | H04L 63/08 | 726/3 |
| 2013/0124700 A1* | 5/2013 | Miller | G06F 9/44526 | 709/220 |
| 2013/0145361 A1* | 6/2013 | Kaegi | H04L 67/10 | 717/176 |
| 2013/0185362 A1* | 7/2013 | Clagg | G06F 21/629 | 709/206 |
| 2013/0269018 A1* | 10/2013 | Dingwall | G06F 21/34 | 726/8 |
| 2013/0275958 A1* | 10/2013 | Ivanov | G06F 8/61 | 717/174 |
| 2014/0297824 A1* | 10/2014 | Batson | H04L 67/10 | 709/223 |
| 2015/0207817 A1* | 7/2015 | Perry | G06F 21/53 | 726/23 |
| 2015/0350341 A1* | 12/2015 | Daute | G06F 11/3688 | 714/38.1 |
| 2015/0350912 A1* | 12/2015 | Head | H04W 12/08 | 726/4 |
| 2015/0370690 A1* | 12/2015 | Rodmell | G06F 11/008 | 717/124 |
| 2016/0087933 A1* | 3/2016 | Johnson | H04W 4/70 | 709/245 |
| 2016/0337206 A1* | 11/2016 | Bugenhagen | H04L 67/34 | |
| 2017/0097842 A1* | 4/2017 | Bugenhagen | G06F 9/45558 | |
| 2017/0223052 A1* | 8/2017 | Stutz | H04L 63/1416 | |
| 2018/0225230 A1* | 8/2018 | Litichever | G06F 21/56 | |

OTHER PUBLICATIONS

P. Sköldström and K. Yedavalli, "Network virtualization and resource allocation in OpenFlow-based wide area networks," 2012 IEEE International Conference on Communications (ICC), Ottawa, ON, 2012, pp. 6622-6626. (Year: 2012).*

Microsoft, "Network Policy Server Extensions", https://msdn.microsoft.com/en-us/library/bb891989(v=vs.85).aspx, Aug. 31, 2016, 1 page.

* cited by examiner

NETWORK AUTHENTICATION SYSTEM EXTENSIONS

BACKGROUND

Network operating systems may have a user authenticated in order to log onto the network. Network authentication may verify the user's identity to each network service that the user attempts to access. Authentication may be an important part of a network's security scheme to validate an identity of a user, computer, or service. A number of different authentication methods and protocols may be used, depending on the network operating system and connection type.

DETAILED DESCRIPTION

Network authentication systems provide a centralized platform for network security and access control. As used herein, a network authentication system refers to a system that executes security policies, provisions devices, and performs various network operations in a wired and/or wireless network. Certain use cases for authentication or authorization within a network authentication system may necessitate unique or custom-developed instructions. For instance, a user may desire to check an authenticating device against a specific database or application server at the time of the authentication request. In another example, a user may desire to setup authentication credentials for network access based on a third-party system that registers visitors at the front desk. In such instances, extensions to the basic functionality of the network authentication system may be desirable.

In accordance with the present disclosure, network authentication system extensions may provide the capability to package custom instructions as an "extension" which is present on the network authentication system. As used herein, an extension refers to instructions which, when executed by a processing resource, provide functionality not provided by the network authentication system itself. The extension may be isolated from the network authentication system, except through specific controlled points of access that are specified within the extension, referred to herein as "ports". By limiting access of the extensions to the network authentication system, the extensions may be prevented from performing arbitrary operations or tampering with the underlying network authentication system. Moreover, by limiting access of extensions to the network authentication system, resources allocated to the extension may be controlled, such that the potential impact on the network authentication system may be limited in the event of a problem with the extension.

Figure 1:
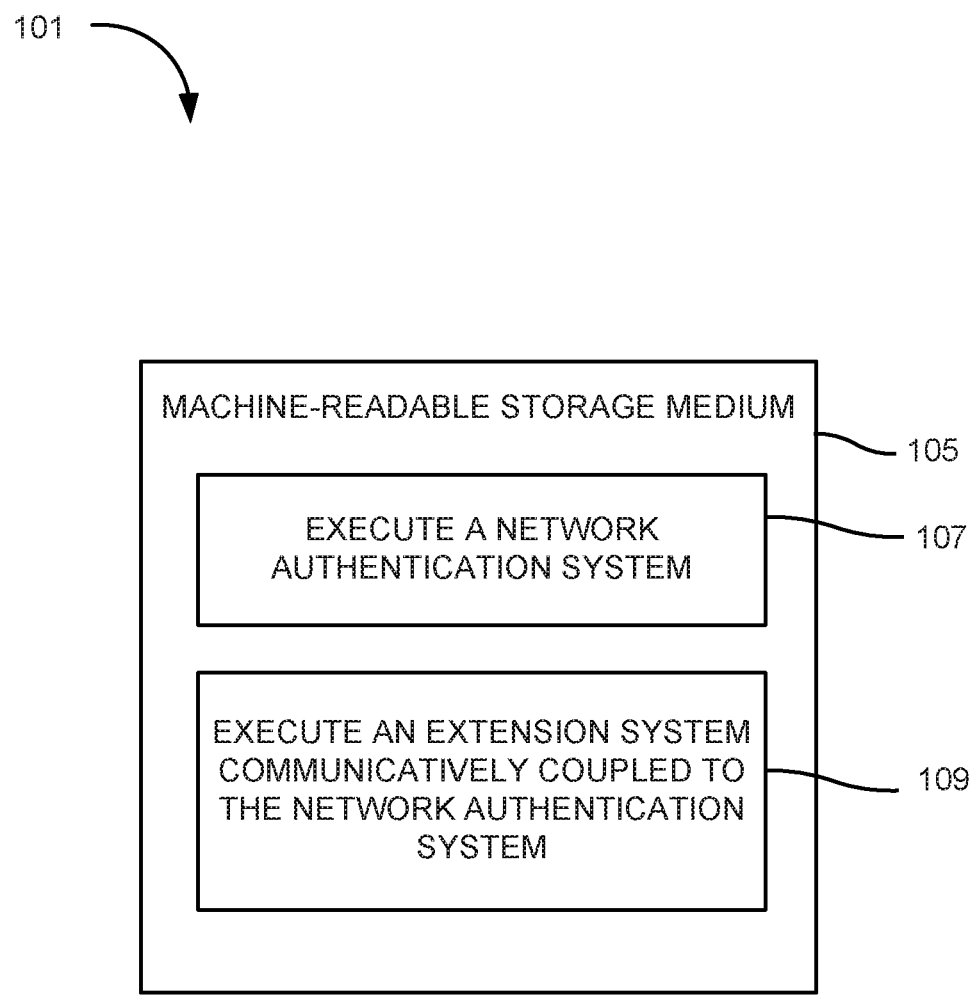
FIG. 1 illustrates an example environment for network authentication system extensions, consistent with the present disclosure.

FIG. 1 illustrates an example environment 101 for network authentication system extensions, consistent with the present disclosure. As described herein, the components illustrated in FIG. 1 may perform a number of functions related to network authentication system extensions. Although the following descriptions refer to a single processing resource and a single machine-readable storage medium 105, the descriptions may also apply to a system with multiple processing resources and multiple machine-readable storage mediums. In such examples, the environment 101 may be distributed across multiple machine-readable storage mediums and multiple processing resources. Put another way, the instructions executed in the environment 101 may be stored across multiple machine-readable storage mediums and executed across multiple processing resources, such as in a distributed or virtual computing environment.

As illustrated in FIG. 1, the environment 101 may comprise a non-transitory machine-readable storage medium 105 storing machine readable instructions to cause a processing resource (not illustrated in FIG. 1) to perform a number of operations relating to network authentication system extensions. That is, using the processing resource and the machine-readable storage medium 105, network authentication system extensions may be managed by environment 101. Processing resource may be a central processing unit (CPU), microprocessor, and/or other hardware device suitable for retrieval and execution of instructions stored in machine-readable storage medium 105.

The environment 101 may include instructions 107 executable by the processing resource to execute a network authentication system. As used herein, a network authentication system refers to a system that executes security policies, provisions devices, and performs various network operations in a wired and/or wireless network. The network authentication system may perform operations developed and installed by the provider of the network authentication system. Such operations are referred to herein as a "basic functionality" of the network authentication system.

The environment 101 may also include instructions 109 executable by the processing resource to execute an extension system communicatively coupled to the network authentication system. As used herein, an extension system refers to a system communicatively coupled to the network authentication system, where the extension system provides the capability to develop, share, edit, and deploy extensions for the network authentication system. For instance, the extension system may include a development kit. As used herein, a development kit refers to a collection of resources for developing extensions for the network authentication system. Similarly, the extension system may include an extension store. As used herein, an extension store refers to a forum accessible by a specified group of users, which allows the users to view, search, publish, and download extensions, among other actions described herein. The extensions published in the extension store, referred to herein as "published extensions", may be deployable on the network authentication system.

As described herein, extensions may be self-contained and may not have any requirements from the network authentication system, except that the network authentication system supports extensions to begin with. By being self-contained, it may be ensured that each extension includes all of its components for execution, and will therefore be able to run in the same way regardless of the environment it is running in. Moreover, by being self-contained, extensions may be implemented as pieces of functionality that do not have complex integration requirements. Lastly, by being self-contained new versions and features can be added as new or modified extensions, rather than based on the network authentication system's evolution.

As described herein, an extension may include its own metadata which specifies details about what the extension is, and how it interoperates with the rest of the network authentication system. This can include interactions with the network, interactions with other extensions, interactions with the local system's published application programming interfaces (APIs), interactions with the local system's file system for state storage/logging, interactions with the local system for configuration, among other pieces of information. The metadata of an extension may also include identification of network ports through which the extension may connect with the network authentication system and/or other extensions. That is, an extension may be isolated from other extensions that may be running in the network authentication system, except through specific controlled points of access that are specified with the extension.

The extension system may allow users to package an application with all of its dependencies into a standardized unit for development. The extension system generates a complete filesystem that contains everything the extension needs to run, including instructions, system tools, and system libraries, among other sets of machine readable instructions that may be installed on a server. This guarantees that the extension will always run the same, regardless of the environment it is running in. In such a manner, extensions may be referred to as self-contained applications.

Each of the extensions may define a capability beyond a basic functionality of the network authentication system. The instructions 109 to execute the extension system may include instructions to develop a new extension for the network authentication system by adding metadata to a deployment package and implementing the added metadata using a label command in the deployment package. As used herein, a "new" extension refers to an extension that was not previously included in the extension store.

The instructions 109 executable by the processing resource to execute the extension system may include instructions to execute an extension store, including certification and testing information for each extension in the extension store. Each extension may be packaged as a single unit and distributed using the extension store. The extension store enables users to discover new extensions by searching, which increases the functionality of the network authentication system after purchase. The extension store also enables code assurance to be performed on the extensions before they are authorized for release, such as code-signing through public key infrastructure (PKI), and extension verification. Moreover, the extension store may enable a user to receive extensions that have been developed specifically for that user. Put another way, the extension store may publish user-specific extensions, which are not publicly available.

As discussed, the instructions 109 to execute the extension system may include instructions to store developer support resources, extension documentation, and training materials in the extension system. For instance, the extension system may include translations, how-to guides, deployment guides, setup guides, and other reference materials.

Figure 2:
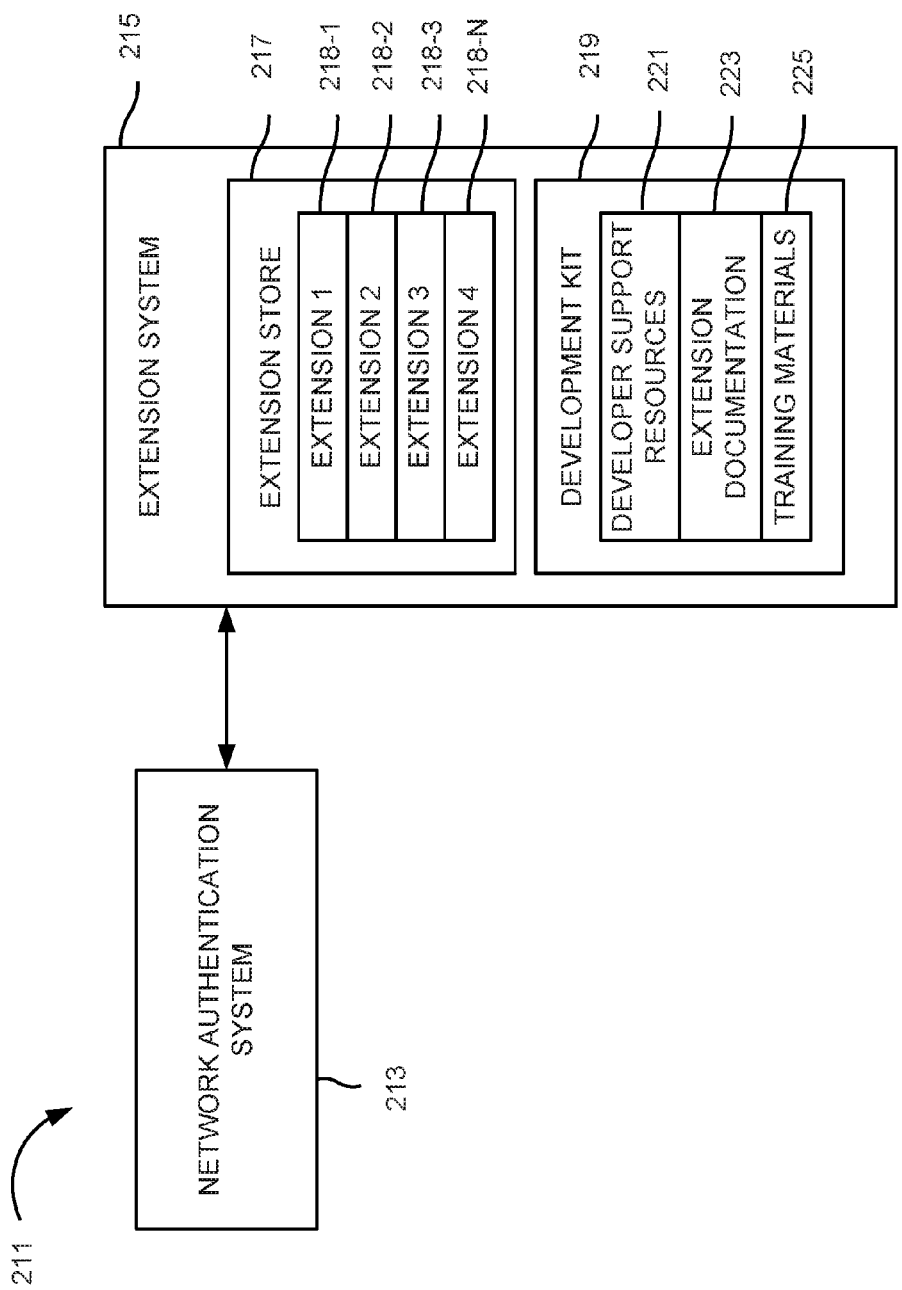
FIG. 2 further illustrates an example environment for network authentication system extensions, consistent with the present disclosure.

FIG. 2 further illustrates an example environment 211 for network authentication system extensions, consistent with the present disclosure. The environment 211 may be analogous to the environment 101 illustrated in FIG. 1. That is, the instructions 107 may execute the network authentication system 213, and the instructions 109 may execute the extension system 215. As discussed with regard to FIG. 1, the extension system 215 may be communicatively coupled to the network authentication system 213. That is, the network authentication system 213 and the extension system 215 may transmit information to one another via ports, as discussed herein. The extension system 215 may be limited in that it may interact with the network authentication system 213, as discussed further with regard to FIG. 3.

The extension system 215 may include a plurality of components. For example, the extension system 215 may include an extension store 217 to store a plurality of extensions 218-1, 218-2, 218-3, . . . , 218-N (hereinafter referred to collectively as extensions 218). Each of the extensions 218 may be created by, published by, and/or modified by users of the environment 211.

In some examples, access to extensions 218 may be limited. For instance, extensions 218-3 and 218-N may be available for public viewing and download, whereas extensions 218-1 and 218-2 may be available for viewing and download by a subset of the users of environment 211. Additionally, extensions may be added, deleted, or modified in accordance with examples herein. As such, the contents of extension store 217 may change pursuant to changes in extensions 218. As such, the extension system 215 may include a development kit 219 to assist users in developing, using, and/or editing extensions. For instance, the development kit 219 may include developer support services 221, extension documentation 223, and training materials, among others. Examples are not so limited, however, and the extension system 215 may include more or fewer components than illustrated in FIG. 2.

Figure 3:
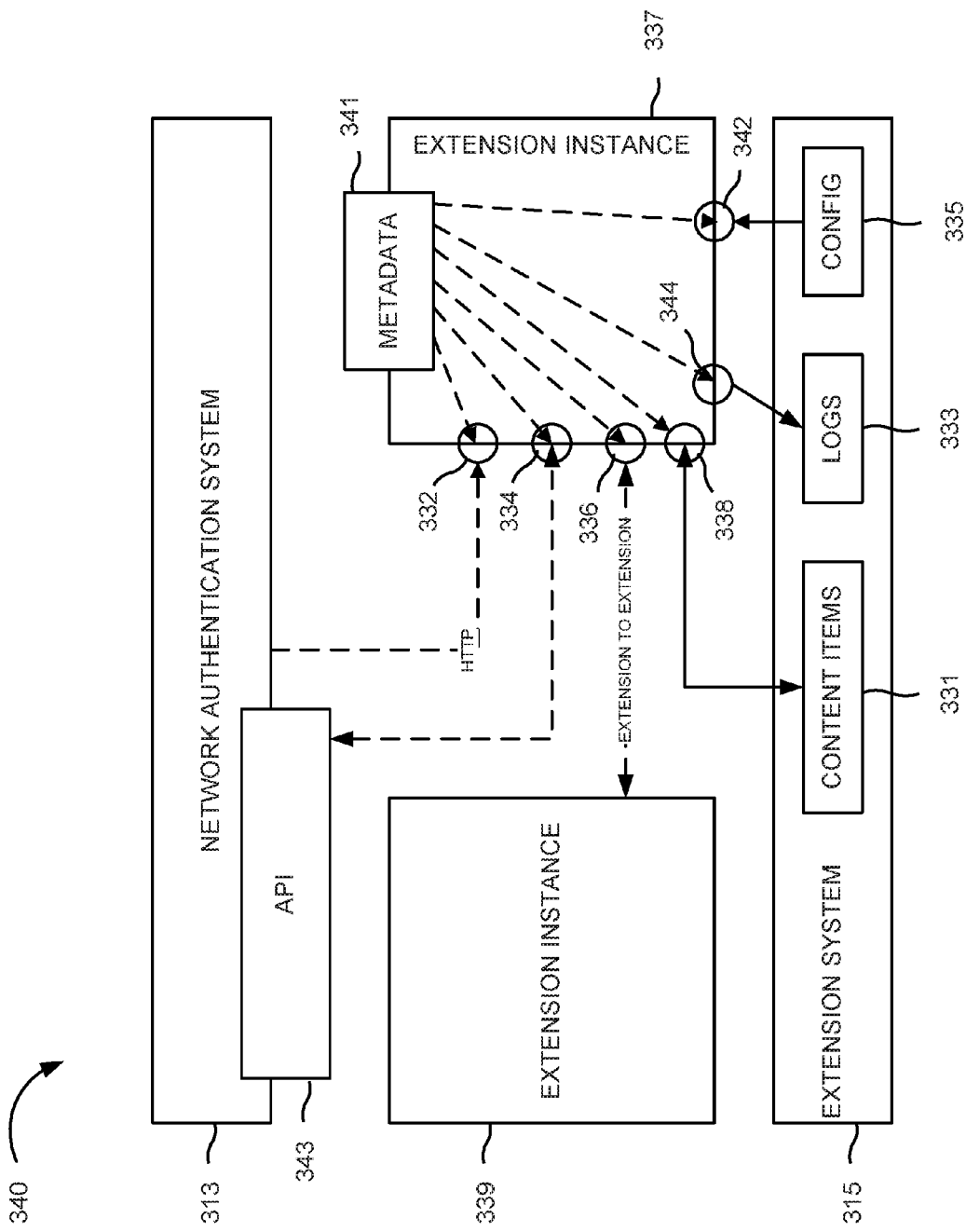
FIG. 3 illustrates an example architecture for network authentication system extensions, consistent with the present disclosure.

FIG. 3 illustrates an example architecture 340 for network authentication system extensions, consistent with the present disclosure. As illustrated in FIG. 3, an extension instance 337 may interact with the network authentication system 313. The network authentication system 313 may be executed by an application server, which may be different than the application server that provides the extension system 315. As used herein, an instance of an extension refers to a copy of a developed extension. Extensions may have a single instance or a plurality of extension instances installed, and a plurality of different extension instances may be installed at one time. For example, referring to FIG. 3, extension instance 337 may be the same as, or different than, extension instance 339.

As discussed herein, extension instances 337 and 339 may interact with the network authentication system 313 through an application programming interface (API), such as a representational state transfer (REST) API 343. While a REST API is used herein, it is noted that other types of APIs may be used to interface the network authentication system 313 and extension instances 337 and 339.

Initially, the functionality of all extensions may be fully exposed via the API 343. As described herein, the API 343 may be a REST API, though examples are not so limited. In such a manner, a user may manage the system's installed extensions using a series of commands. For instance, a user may use commands such as "get", "post", "patch", and/or "delete" to manage the installed extensions. The "get" command may get a list of installed extensions or details of an installed extension from the network authentication system 313. The "post" command may install an extension, and the "patch" command may change the state of an installed extension. Moreover, the "delete" command may uninstall an extension. For example, the "post" command may define instructions to restart an installed extension, start an installed extension, and stop an installed extension. Example post commands may have the format, "POST /api/extension/instance/{id}/{action}", where {id} refers to an identifier for the extension instance, and {action} defines the action to be taken. That is, example post commands may include:

POST /api/extension/instance/{id}/restart
POST /api/extension/instance/{id}/start
POST /api/extension/instance/{id}/stop Similarly, "get" and "put" commands may be used to manage the system's installed extensions. The "get" commands may define instructions to get the configuration of an installed extension, and the "put" commands may set the configuration of an installed extension. For example, to configure an installed extension, the following commands may be used:

GET /api/extension/instance/{id}/config
PUT /api/extension/instance/{id}/config

Moreover, "log" commands may be used to obtain and review log files in the network authentication system 313. System logs include details about extensions, extension logs, configurations, and other system state information. The system log enables trouble shooting. For instance, to read logs from an installed extension, the following commands may be used:

GET /api/extension/instance/{id}/log

Also, various commands may be used to access the extension store. For example, to find an extension in the extension store, the following command may be used:

GET /api/extension/store

To get details of an extension in the extension store, the following command may be used:

GET /api/extension/store/{id}

To build new extensions, metadata 341 may be added to an extension. Metadata may be implemented using a label command, and may provide the orchestration between the extension (such as extension instance 337) and the network authentication system 313.

As illustrated in FIG. 3, metadata 341 may be associated with an extension instance (such as 337). The metadata may describe what the extension is, including the name, version, description, icon, etc. The metadata may further describe how the extension works. For instance, the metadata 341 may include a hypertext transfer protocol (HTTP) mapping 332 to the network authentication system 313, a list of transmission control protocol (TCP) or user datagram protocol (UDP) ports (not illustrated in FIG. 3), a reference 334 for REST API usage, a reference 344 to log files 333, a reference 342 to configuration files 335, a reference 338 for extension-to-extension coordination (such as coordination between extension instance 337 and extension instance 339), and a reference 338 to content mapping items 331.

Each extension may include basic metadata. Basic metadata for an extension may include an identification of the extension, such as with a ".extension.name=" label. Each extension may have a unique name. Moreover, all extensions may use a same prefix, such as "com.{application server}.extension". A file may be formed that combines all of the basic metadata for an extension into a single command. For instance, the basic metadata for an extension may include:

LABEL com.{network authentication system}.extension.name="My Extension"\
com.{network authentication system}.extension.version="1.0"\
com.{network authentication system}.extension.description=" . . . "\
com.{network authentication system}.extension.icon.href=" . . . "

Each extension may include a plurality of configurations. For instance, a restart policy may be defined. The restart policy may control whether the extension is automatically restarted under particular circumstances. For instance, an extension may be configured with a default restart policy that defines that the extension will not be automatically restarted. In another example, the extension may be configured with a restart policy indicating that the extension will restart on failure. Similarly, the extension may be configured with a restart policy indicating that the extension will restart on failure up to a specified number (N) of times. In other examples, the extension may be configured with a restart policy indicating that the extension will always restart. And in yet other examples, the extension may be configured with a restart policy indicating that the extension will restart unless it is stopped or terminated, such as by a user or administrator.

Extensions may include other configurations. For example, extensions may include configurations identifying them as singleton extensions. If a certain label is present, this means that the extension is a singleton extension. Singleton means that one instance of the extension may be present on the server (e.g., the server executing the network authentication system 313). The default is that this value is unset, meaning that multiple instances of the same extension may be present on the server.

Additionally, configuration of an extension may include identification of extension hostnames. If a hostname label is present, the configuration specifies a hostname inside the extension. Just the hostname may be identified, not a fully-qualified domain name (FQDN). Such configuration may be useful to link extensions together by name. Configuration of a hostname for an extension implies that the extension is a singleton. The default is that the hostname is unset, and a hostname will be assigned randomly by the extension system 315.

Configuration of an extension may also include identification of extension log files. Such configuration may specify a location of the extension's log files directory. Identification of the extension's log files enables extension logs 333 to be collected by the extension system 315 for troubleshooting. The default is that no logs are tracked and/or collected.

Moreover, extensions may be configured to access the network authentication system 313 via an API, such as API 343. That is, the extension may be configured for REST API 343 access the network authentication system 313. In such a manner, the extension instance 337 may provide unique credentials to access the API 343, where the API asks for authentication. This also provides ease of implementation, as the network authentication system does not need to manage authentication credentials itself.

Extension configurations in metadata 341 may include a mapping of content items 331. The mapping of content items 331 may identify a file used by the extension, but not provided with it. An example of mapped content may include a client certificate and a private key used for authentication. Mapping of contents may be useful for complex configuration, such as where orchestration of multiple files may be performed. The default is that content mapping configuration is unset, and no content items are included.

The metadata 341 for an extension may also include an extension configuration file. The extension configuration file may be mapped to a configuration file, such as configuration file 335, located on the server providing the extension system 315. The metadata 341 may also specify the format of the extension's configuration file. For example, the extension file may be stored as plain JavaScript object notation (JSON) data. In other examples, the extension file may be stored as a node.js module. Moreover, the extension file may be stored as plain text. The default configuration is that each extension is stored in as JSON data.

The metadata 341 for an extension may also indicate whether the extension's network ports will be published. If a publish label is present, the extension's network ports will be published. Such a command allocates a random host network port for all of the extension's network ports. Similarly, a command may be provided that checks the metadata of the extension to see the mappings between the network authentication system 313 and the network ports of the extension instance (such as extension 337). The default is that no extension network ports are published.

Moreover, the metadata 341 for an extension, such as extension instance 337, may include a mapping of extension network ports. The mapping of extension network ports maps a specific port number on the network authentication system 313 to a network port on the extension (e.g., extension instance 337 in this particular example). The default is that mapping of extension network ports is unset, and no extension network ports are mapped to the network authentication system 313.

Also, the metadata 341 for an extension, such as extension instance 337, may include instructions 336 on linking extension ports together. Extensions may coordinate with one another through this mechanism. For instance, extension instance 337 may coordinate with extension instance 339 to provide added functionality to the network authentication system 313. The default is that extension links are unset, and no links are configured.

Figure 4:
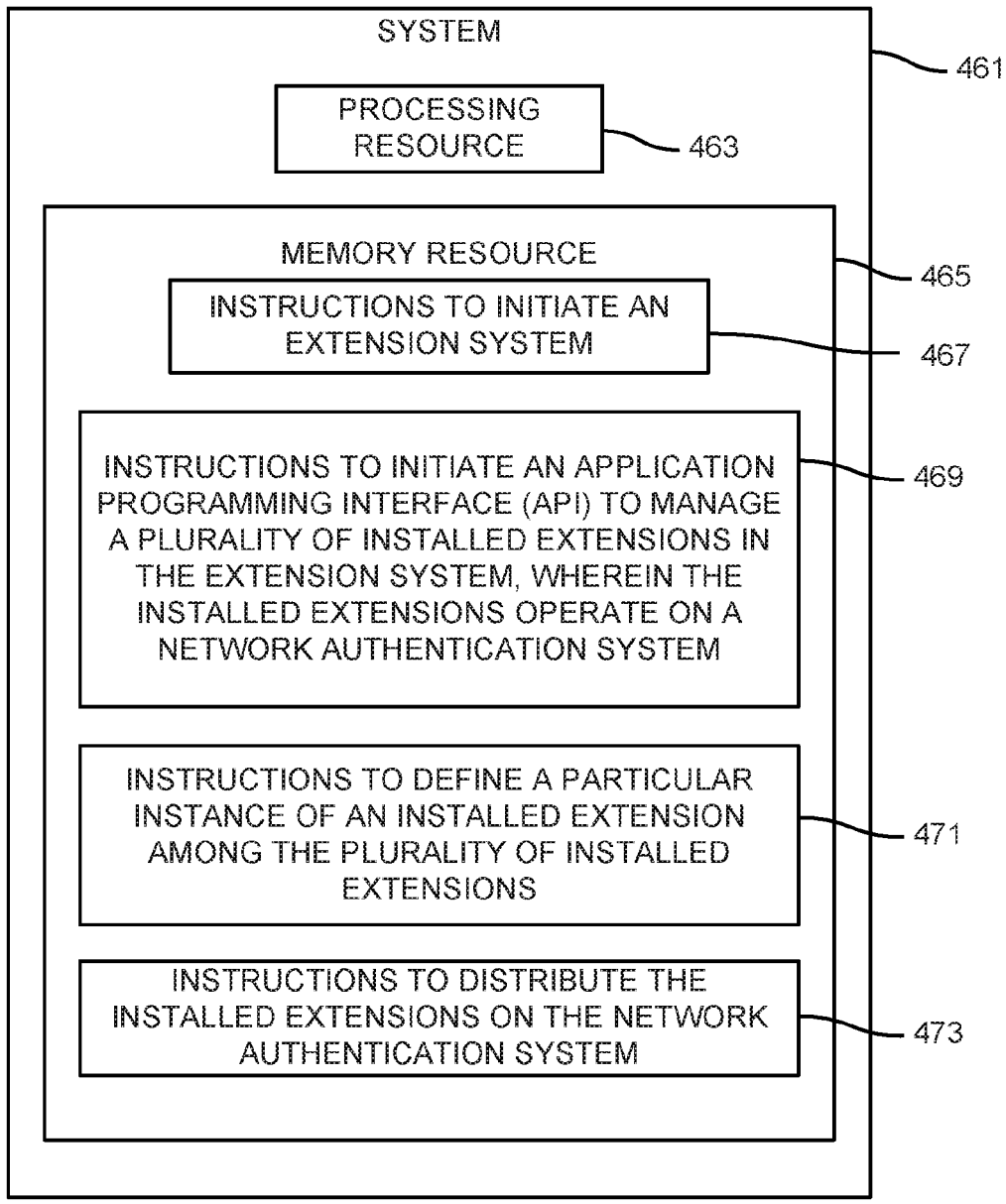
FIG. 4 is a block diagram of an example system for network authentication system extensions, consistent with the present disclosure.

FIG. 4 is a block diagram of an example system 461 for network authentication system extensions, consistent with the present disclosure. The system 461 may include a computing device that is capable of communicating with a remote system. In the example of FIG. 4, the system 461 includes a processing resource 463 and a memory resource 465. The memory resource 465 may store readable instructions to cause the processing resource 463 to perform a number of operations. Although the following descriptions refer to a single processing resource and a single memory resource, the descriptions may also apply to a system with multiple processing resources and multiple memory resources. In such examples, the instructions may be distributed across multiple memory resources and the instructions may be distributed across multiple processing resources. Put another way, the instructions may be stored across multiple machine-readable storage mediums and executed across multiple processing resources, such as in a distributed computing environment.

Processing resource 463 may be a central processing unit (CPU), microprocessor, and/or other hardware device suitable for retrieval and execution of instructions stored in memory resource 465. In the particular example shown in FIG. 4, processing resource 463 may receive, determine, and send instructions 467, 469, 471, and 473. As an alternative or in addition to retrieving and executing instructions, processing resource 463 may include an electronic circuit comprising a number of electronic components for performing the operations of the instructions in the memory resource 465. With respect to the executable instruction representations or boxes described and shown herein, it should be understood that part or all of the executable instructions and/or electronic circuits included within one box may be included in a different box shown in the figures or in a different box not shown.

Memory resource 465 may be any electronic, magnetic, optical, or other physical storage device that stores executable instructions. Thus, memory resource 465 may be, for example, Random Access Memory (RAM), an Electrically-Erasable Programmable Read-Only Memory (EEPROM), a storage drive, an optical disc, and the like. The executable instructions may be stored on the memory resource 465. Memory resource 465 may be a portable, external or remote storage medium, for example, that allows the system to download the instructions from the portable/external/remote storage medium. In this situation, the executable instructions may be part of an "installation package". As described herein, memory resource 465 may be encoded with executable instructions for network authentication system extensions.

The instructions to initiate an extension system 461, when executed by a processing resource such as processing resource 463 may cause system 461 to initiate an extension system. For example, referring to FIG. 2, the instructions 467 may cause the system 461 to initiate the extension system 215.

The system 461 may also include instructions 469 executable by a processing resource, such as processing resource 463, to initiate an application programming interface (API) to manage a plurality of installed extensions in the extension system, wherein the installed extensions operate on a network authentication system. That is, referring to FIG. 3, the instructions 469 may initiate the API which allows an extension instance to access the network authentication system, using the commands described herein.

The system 461 may also include instructions 471 executable by a processing resource, such as processing resource 465, to define a particular instance of an installed extension among the plurality of installed extensions. The instructions 471 to define the particular instance of the installed extension may include instructions to define an action for the particular instance, a configuration element for the particular instance, or a functional characteristic of the particular instance. For example, as described herein, to define the particular instance of an installed extension, instructions to define a configuration for the installed extension in metadata of the installed extension may be executed. That is, referring to FIG. 3, a data format for the installed extension may be provided. If a data format for the installed extension is not provided a default data format for the installed extension may be provided in response to a determination that the data format was not received.

Also, as described herein, the instructions 471 to define the particular instance of the installed extension may include instructions to define circumstances to restart the particular instance of the installed extension, circumstances to start the particular instance of the installed extension, and circumstances to stop the particular instance of the installed extension. The instructions 471 to define the particular instance of the installed extension may include instructions to configure the extension according to the various configuration options described herein.

The system 461 may also include instructions 473 executable by a processing resource, such as processing resource 463, to distribute the installed extensions on the network authentication system. That is, referring to FIG. 2, the instructions 473 may cause execution of installed extensions on the network authentication system 213.

The system 461 may also include instructions executable by a processing resource, such as processing resource 463, to query an extension store including a plurality of published extensions, using a hypertext transfer protocol secure (HTTPS) API. The instructions to query the extension store may include instructions to identify an extension among the plurality of published extensions having a particular characteristic. Similarly, the instructions to query the extension store may include instructions to obtain details of a published extension in the extension store, as described herein, such as using a "get" command.

The system 461 may also include instructions executable by a processing resource, such as processing resource 463, to define access rights for the extension store, wherein each access right identifies a user that may publish and modify extensions in the extension store. That is, in some examples, all users may publish, modify, and/or delete extensions in the extension store. In other examples, less than all of the users may publish, modify, and/or delete extensions. As described herein, some extensions may be accessible to a subset of the users.

In some examples, the system 461 may include instructions executable by a processing resource, such as processing resource 463, to assign each of the published extensions to a respective extension channel, and publish the extensions on the respective assigned extension channel. For instance, a particular extension channel may include extensions that relate to a common theme, or portion of the network authentication system. In another example, an extension channel may include extensions that are created by a common entity. Examples are not so limited, however, and other forms of extension channels may exist, where an extension channel includes a list of extensions related by a common factor. As such, an extension may be published to a particular extension channel, such that users that have access to the particular extension channel, will be able to access the newly published extension.

Figure 5:
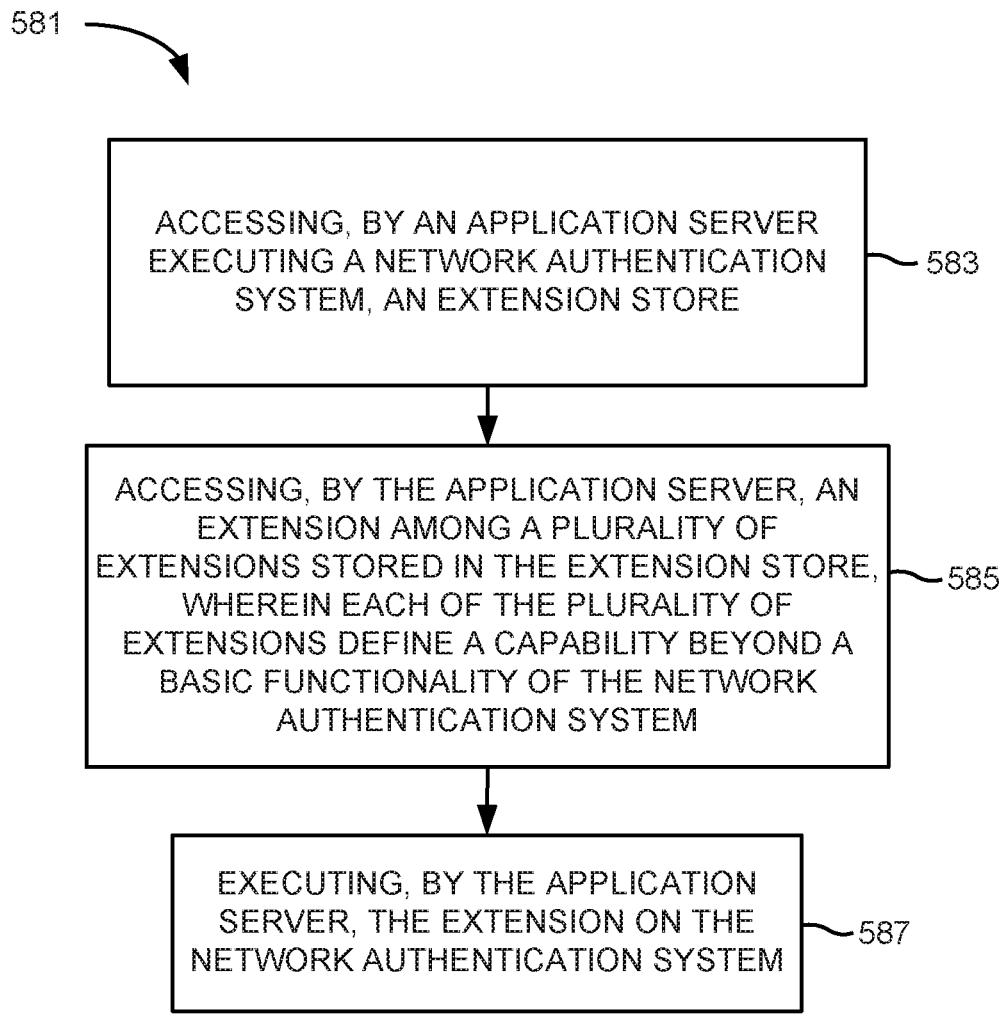
FIG. 5 is a block diagram of an example method, consistent with the present disclosure.

FIG. 5 illustrates an example method 581 consistent with the present disclosure. At 583, the method 581 may include accessing, by an application server executing a network authentication system, an extension store. As described herein, a first application server may provide the network authentication system, whereas a second application server may provide the extension store.

At 585, the method 581 may include accessing, by the application server, an extension among a plurality of extensions stored in the extension store, where each of the plurality of extensions define a capability beyond a basic functionality of the network authentication system.

At 587, the method 581 may include executing, by the application server, the extension on the network authentication system. Executing the extension may include mapping a network port on the application server to a network port of the extension, such that the extension appears as part of the network authentication system. Put another way, by mapping a network port of the network authentication system to a network port of the extension, the extension may appear to a user as a part of the network authentication system itself.

In some examples, the method 581 may include collecting, by the application server, log file directories from each of a plurality of extensions executed by the application server. For instance, as described herein, a plurality of extensions may be operating on a network authentication system, supported by the application server. The network authentication system may collect the log file directories from each of the extensions running.

In some examples, the method 581 may include linking, by the application server, a plurality of executed extensions including the extension, such that the plurality of executed extensions provide a plurality of coordinated capabilities beyond the basic functionality of the network authentication system. Again, each extension may provide different and/or additional capabilities to supplement the network authentication system. By linking together each of the plurality of extensions, the operation of the network authentication system may be coordinated.

Additionally, as discussed in relation to FIG. 3, the method 581 may include providing to an extension system, by the application server, access to a REST API or other API of the network authentication system.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. As used herein, the designator "N", particularly with respect to reference numerals in the drawings, indicates that a number of the particular feature so designated can be included with examples of the present disclosure. The designators can represent the same or different numbers of the particular features. Further, as used herein, "a number of" an element and/or feature can refer to one or more of such elements and/or features.

What is claimed:

1. A system, comprising:
    a processing resource; and
    a memory resource storing readable instructions to cause the processing resource to:
        initiate an extension system;
        initiate an application programming interface (API) to manage a plurality of extensions in the extension system, wherein an extension of the plurality of extensions is a self-contained application comprising executable instructions and metadata, the metadata identifying a specific network port that the extension must use to connect to a network authentication system, the extension being otherwise isolated from the network authentication system except through the specified network port; and wherein the extension interoperates with the network authentication system only after establishing a connection through the specified network port; and further wherein the extension is connected to another extension of the plurality of extensions through the specified network port using the metadata;
        define a particular instance of the extension among the plurality of extensions;

execute the extension to provide functionality to the network authentication system.

2. The system of claim 1, wherein the instructions to define the particular instance of the extension further include instructions to define:
an action for the particular instance;
a configuration element for the particular instance; or
a functional characteristic of the particular instance.

3. The system of claim 1, wherein the instructions to define the particular instance of the extension further include instructions to:
receive a data format for the configuration of the extension; or
provide a default data format for the extension in response to a determination that the data format was not received.

4. The system of claim 1, wherein the instructions to define the particular instance of the extension further include instructions to:
map an extension file identifier for the extension to content item of the network authentication system.

5. The system of claim 1, further including instructions to query the extension store including the plurality of published extensions, using a hypertext transfer protocol secure (HTTPS) API.

6. The system of claim 5, wherein the instructions to query the extension store include instructions to identify an extension among the plurality of published extensions having a particular characteristic.

7. The system of claim 5, wherein the instructions to query the extension store include instructions to obtain details of a published extension in the extension store.

8. The system of claim 1, further including instructions to cause the processing resource to define access rights for the extension store, wherein each access right identifies a user that may publish or modify extensions in the extension store.

9. The system of claim 1, wherein the instructions to define the particular instance of the extension include instructions to hide the particular instance from public view.

10. A non-transitory machine readable medium including instructions executable by a processing resource to:
execute a network authentication system; and
execute an extension system communicatively coupled to the network authentication system, by executing:
a development kit including resources for developing extensions for the network authentication system, wherein:
an extension developed with the development kit is a self-contained application comprising executable instructions and metadata, the metadata identifying a specific network port that the extension must use to connect to a network authentication system, the extension being otherwise isolated from the network authentication system except through the specified network port; and further wherein an extension developed with the development kit is connectable to another extension developed with the development kit through the specified network port using the metadata;
an extension store to publish the extensions developed with the development kit, wherein the published extensions are interoperable with the network authentication system; and
execute a first published extension to provide functionality to the network authentication system beyond a basic functionality of the network authentication system.

11. The medium of claim 10, wherein the instructions to execute the extension store include instructions to publish certification and testing information for each of the extensions in the extension store.

12. The medium of claim 10, wherein the instructions to execute the extension system include instructions to:
develop a new extension for the network authentication system by adding metadata to a deployment package; and
implement the added metadata in the deployment package.

13. The medium of claim 10, wherein the instructions to execute the extension system include instructions to store developer support resources, extension documentation, and training materials in the extension system.

14. The medium of claim 10, wherein the instructions to execute the extension system include instructions to:
distribute a subset of the extensions to a subset of users of the network authentication system.

15. The medium of claim 10, wherein the instructions to execute the extension system include instructions to:
assign each of the published extensions to a respective extension channel; and
publish the extensions on the respective assigned extension channel.

16. A method, comprising:
accessing, by an application server executing a network authentication system, an extension store from which extensions may be viewed, searched, published, and downloaded;
accessing, by the application server, a published extension among a plurality of published extensions stored in the extension store, wherein: the published extension is a self-contained application comprising executable instructions and metadata, the metadata identifying a specific network port that the extension must use to connect to a network authentication system, the extension being otherwise isolated from the network authentication system except through the specified network port; and further wherein the published extension of the plurality of published extensions is connected to another published extension of the plurality of published extensions through the specified network port using the metadata; and
executing, by the application server, the first published extension to provide functionality not otherwise available on the network authentication system.

17. The method of claim 16, further comprising:
collecting, by the application server, log file directories from each of a plurality of published extensions executed by the application server.

18. The method of claim 16, wherein executing the first published extension includes:
mapping a network port on the application server to a network port of the first published extension, such that the first published extension appears as part of the network authentication system.

19. The method of claim 16, comprising:
linking, by the application server, a plurality of the executed published extensions including the first published extension, such that the plurality of executed published extensions provide a plurality of coordinated capabilities beyond the basic functionality of the network authentication system.

20. The method of claim 16, comprising:
providing to an extension system, by the application server, access to an application programming interface (API) of the network authentication system.

* * * * *